United States Patent [19]

Flesher et al.

[11] Patent Number: 5,483,076

[45] Date of Patent: Jan. 9, 1996

[54] AUTORADIOGRAPHY CASSETTE

[75] Inventors: Robert W. Flesher, Baltimore; Michael DeManche, Germantown, both of Md.; Michael W. Schuette, Vienna, Va.

[73] Assignee: Life Technologies, Inc., Gaithersburg, Md.

[21] Appl. No.: 286,434

[22] Filed: Aug. 5, 1994

Related U.S. Application Data

[63] Continuation-in-part of Ser. No. 133,258, Oct. 8, 1993, abandoned.

[51] Int. Cl.⁶ .......................... G03B 42/00; G03B 42/04
[52] U.S. Cl. ............................... 250/475.2; 378/187
[58] Field of Search .......................... 378/182, 184, 378/187; 250/484.4, 475.2

[56] References Cited

U.S. PATENT DOCUMENTS

| | | |
|---|---|---|
| 2,590,891 | 4/1952 | Reuter . |
| 2,590,892 | 4/1952 | Reuter . |
| 2,694,153 | 11/1954 | Reuter . |
| 3,704,369 | 11/1972 | Paidosh .................. 378/184 |
| 4,264,821 | 4/1981 | Bauer . |
| 4,346,300 | 8/1982 | Turner .................. 378/187 |
| 4,350,248 | 9/1982 | Bauer .................. 378/187 |
| 4,386,431 | 5/1983 | Van Landeghem et al. ........... 378/187 |
| 4,408,340 | 10/1983 | Bauer .................. 378/187 |
| 4,413,896 | 11/1983 | Bauer .................. 354/277 |
| 4,418,420 | 11/1983 | Bauer et al. .................. 378/187 |
| 4,438,164 | 3/1984 | Pfeifer et al. .................. 378/187 |
| 4,479,232 | 10/1984 | Bauer .................. 378/187 |
| 4,589,125 | 5/1986 | Schmidt .................. 378/187 |
| 4,931,643 | 6/1990 | Amtmann .................. 250/484.4 |
| 4,947,419 | 8/1990 | Schmidt et al. .................. 378/187 |
| 4,961,000 | 10/1990 | Finkenzeller et al. ............... 250/484.4 |
| 5,128,978 | 7/1992 | Roth et al. .................. 378/185 |

FOREIGN PATENT DOCUMENTS

| | | |
|---|---|---|
| 1112887 | 8/1961 | Germany . |
| 909658 | 2/1982 | U.S.S.R. . |

*Primary Examiner*—Carolyn E. Fields
*Attorney, Agent, or Firm*—Sterne, Kessler, Goldstein & Fox

[57] ABSTRACT

An autoradiography cassette maintains a sample in close contact with a film and prevents extraneous light from exposing the film. The cassette includes a substantially flat base plate and two flexible magnetic sheets. A first flexible magnetic sheet is attached to the base plate by rivets. The rivets allow the first magnetic sheet to move relative to the base plate in a plane defined by the base plate. A second flexible magnetic sheet is positioned above the first magnetic sheet to magnetically couple with the first magnetic sheet. The rivets allow relative lateral movement between the base plate and the magnetic sheets to account for differences in the coefficients of thermal expansion for the base plate and the magnetically coupled flexible magnetic sheets.

4 Claims, 6 Drawing Sheets

AUTORADIOGRAPHY CASSETTE

RELATED APPLICATION

This application is a continuation-in-part of application Ser. No. 08/133,258, filed Oct. 8, 1993, now abandoned.

BACKGROUND OF THE INVENTION

1. Field of the Invention

The present invention relates generally to film cassettes. More specifically, the present invention relates to autoradiography and chemiluminescence cassettes.

2. Related Art

In the science of autoradiography, a specimen sheet holding a radiation emitting material (e.g., a radioactive material or a light-emitting material) along with a radiation-sensitive film are inserted into an autoradiography cassette. The autoradiography cassette, which is light tight when loaded with the film and specimen, facilitates storage and handling of the film during the required exposure period.

A specimen sheet may include the end product of electrophoresis gel separation of cell tissues. Such gels are generally transferred to a membrane and dried. The transferred products of such a separation are treated with elements which have an affinity for the specimen. Examples of such elements include radioactively tagged antibodies when the specimen is a protein, and a tagged DNA probe when the specimen is DNA.

The radiation level of the specimens is generally low. However, a photographic image may be obtained in an autoradiography cassette because of the close proximity of the membrane and film. In addition, intensifying screens can be used to improve autoradiographic detection. Generally, when using low level radioactive specimens the autoradiography cassette is placed in an extremely cold environment, e.g., −70 degrees Celsius, to allow for proper film exposure.

Conventional autoradiography cassettes are often large and cumbersome to use. They are generally made of heavy steel or aluminum and have thicknesses that exceed 0.5 inches. When inserting a film and a radiation emitting specimen, one conventional cassette requires that a cover be forced against a base using two or more locking bars. Closing such a cassette can be difficult, especially in a dark room.

Another type of autoradiography cassette is made of a cardboard exterior with a paper envelope inside. While easier to use, these cassettes do not ensure a quality contact between a sample (e.g., a radioactive specimen) and the film. Furthermore, the cardboard cassettes must be frequently replaced because, with use, the light tight seals break and the cardboard warps, reducing the quality, of contact between the sample and the film.

What is needed is a durable, reliable and easy-to-use autoradiography cassette.

SUMMARY OF THE INVENTION

The invention is a magnetic autoradiography cassette. The autoradiography cassette maintains a sample in close contact with a film and prevents extraneous light from exposing the film. The cassette includes a substantially flat base plate and two flexible magnetic sheets. A first flexible magnetic sheet is attached to the base plate by rivets. The rivets allow the first magnetic sheet to move relative to the base plate in a plane defined by the base plate (i.e., lateral movement). A second flexible magnetic sheet is positioned above the first magnetic sheet to magnetically couple with the first magnetic sheet. The rivets allow relative lateral movement between the base plate and the magnetic sheets to account for differences in the coefficients of thermal expansion of the base plate and the magnetically coupled flexible magnetic sheets.

In the preferred embodiment, the base plate is made from a general purpose engineering plastic such as ABS. The magnetic sheets are made from a flexible polymer material loaded with a magnetic material. The rivets are rubber. The cassette formed from these materials is well adapted for use which subjects it to extremely low temperatures (e.g., −70 degrees Centigrade).

In an alternate embodiment of the invention a cassette is configured for use in chemiluminescence. This embodiment includes a base plate and a single sheet of flexible magnetic material. A mirrored sheet such as mirrored Mylar is placed between the magnetic sheet and the base plate to intensify the chemiluminescent effect.

BRIEF DESCRIPTION OF THE FIGURES

The foregoing and other features and advantages of the invention will be apparent from the following more particular description of the preferred embodiments of the invention, as illustrated in the accompanying drawings, wherein.

DETAILED DESCRIPTION OF THE PREFERRED EMBODIMENTS

The preferred embodiments of the invention are discussed in detail below. While specific configurations and arrangements are discussed, it should be understood that this is done for illustration purposes only. A person skilled in the relevant art will recognize that other configurations and arrangements may be used without departing from the spirit and scope of the invention.

The preferred embodiments of the invention are described with reference to the figures, where like reference numbers indicate like elements. Also in the figures, the left-most digit of each reference number corresponds to the figure in which the reference number is first used.

Figure 1:
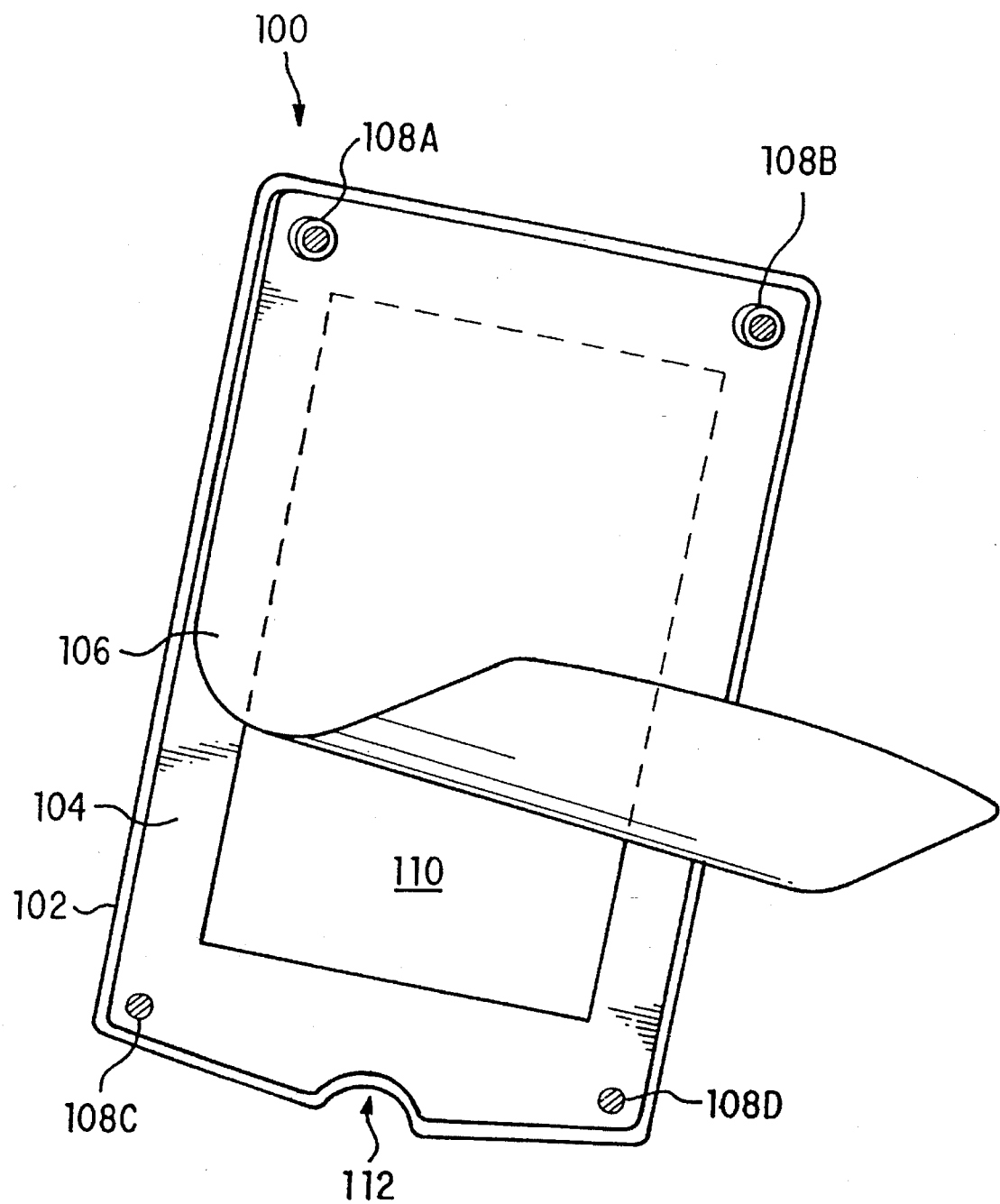
FIG. 1 is an illustration of the autoradiography cassette of the invention.

An autoradiography cassette 100 of the invention is shown in FIG. 1. Cassette 100 includes a base plate or support 102, a first magnetic sheet 104, and a second magnetic sheet 106. Magnetic sheet 104 is secured to base plate 102 by means of four rivets 108. As described in further detail below, first magnetic sheet 104 is secured to base plate 102 but is allowed to move slightly in the plane defined by base plate 102 (i.e., lateral movement).

Second magnetic sheet 106 is held firmly against first magnetic sheet 104 by magnetic attraction forces. Aside from magnetic coupling, second magnetic sheet 106 is not secured to either base plate 102 or first magnetic sheet 104 by other means. This allows second magnetic sheet 106 to be lifted off of first magnetic sheet 104, as illustrated in FIG. 1.

When second magnetic sheet 106 is coupled to first magnetic sheet 104, an inner region 110 is defined. Region 110 is configured to accept an autoradiography film and sample. When a film and sample are positioned between first magnetic sheet 104 and second magnetic sheet 106, the magnetic forces will secure the sheets together at the periphery of region 110. In addition, the magnetic forces will act through the film and sample in region 110 to further magnetically couple the second magnetic sheet 106 to the first magnetic sheet 104. By doing so, the magnetic sheets perform two important functions. First, the magnetic attraction tightly sandwiches the sample and film together to facilitate autoradiography. Second, the magnetic coupling at the periphery of central region 110 prevents ambient light from exposing the film.

Both first magnetic sheet 104 and second magnetic sheet are flexible sheets of magnetic material. Frequently, when performing autoradiography, the sample is a specimen sheet which occasionally curls. Placing a curled specimen sheet in a conventional autoradiography cassette and closing a rigid cover over it can crease the curled sheet. Creases may result in inaccurate experimental results. In the present invention, this problem is avoided. Because second magnetic sheet 106 is flexible, it may be "rolled" onto first magnetic sheet 104. This rolling will help to smooth out a curled sample sheet to prevent creases.

The flexibility of second magnetic sheet 106 also enables cassette 100 to be easily opened. Magnetic sheets 104,106 couple with a force of approximately 85 pounds per square foot. It would be difficult to separate the sheets if not for the flexibility which allows second sheet 106 to be rolled off of first sheet 104. When second magnetic sheet 106 is in a closed position, a user may grasp second magnetic sheet 106 through notch 112 of base plate 102 and first magnetic sheet 104 and peel or roll second magnetic sheet 106 back. If desired, second magnetic sheet 106 may then be completely removed from first magnetic sheet 104.

Figure 2:
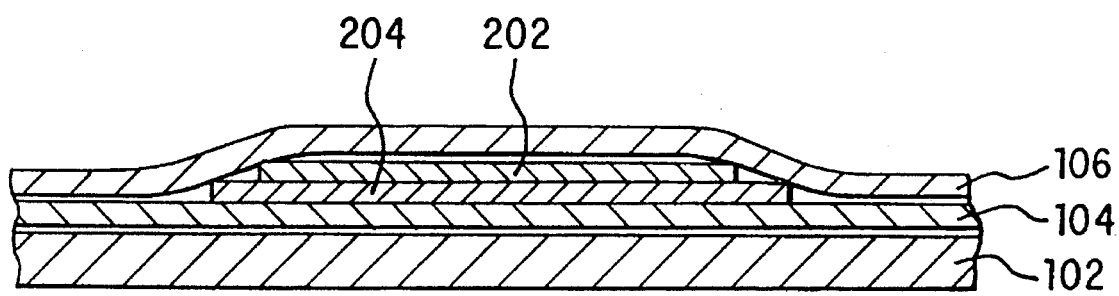
FIG. 2 is a cross-sectional view of the autoradiography cassette illustrating a film and a sample being held firmly together between two flexible magnetic sheets.

FIG. 2 is a cross-sectional view illustrating the sealing of a sample 202 and a film 204 between first magnetic sheet 104 and second magnetic sheet 106. If desired, one or more intensifying screens (not shown) may also be located in central region 110. As is well known in the art, intensifying screens are used to enhance film exposure. An intensifying screen may be placed between sample 202 and film 204, between film 204 and first magnetic sheet 104, or at both locations.

Autoradiography cassette 100 is configured for use in extremely cold temperatures (e.g., −70° C.). Such temperatures pose several problems for an autoradiography cassette. First, a person whose skin touches a metallic substance that has been exposed to such temperatures may be severely burned. In addition, different materials have different coefficients of thermal expansion. Securing materials with different coefficients of expansion together can cause buckling, curling and/or warping as the materials change temperature from, for example, room temperature to −70° C. The present invention has overcome these difficulties.

In the preferred embodiment of the invention, base plate 102 is made from a general-purpose plastic such as ABS (acryl butyl nitrile styrene). First magnetic sheet 104 and second magnetic sheet 106 are made from flexible magnetic sheet stock such as that available from RJF International, Cincinnati, Ohio. In the preferred embodiment, the magnetic sheet stock is manufactured with a pole spacing of 0.095 inches and an energy level of 0.7. The base material is DuPont Hypalon, which is loaded with a magnetic material such as barium ferrite. In the preferred embodiment, first magnetic sheet 104 and second magnetic sheet 106 have a thickness in the range of 0.01 to 0.18 inches. In addition, the top surface of magnetic sheet 106 is covered with a thin layer of vinyl material. The vinyl material may be produced in various colors, such as white, upon which instructions, logos, or other matter may be printed.

The ABS plastic of base plate 102 and the vinyl covering on second magnetic sheet 106 make autoradiography cassette 100 safer for handling at very low temperatures as compared to a conventional cassette having metal parts.

The ABS plastic of base plate 102 has a coefficient of thermal expansion in the range of 4.2 to $5.6 \times 10^{-5}$ inches/° F. The magnetic material of flexible magnetic sheets 102, 104 has a coefficient of thermal expansion of approximately $3.05 \times 10^{-5}$ inches/° F. These disparate coefficients of thermal expansion may cause undesirable warping, curling or bending if the materials are bound together. The present invention, however, joins these materials in a fashion that prevents such warping, curling or bending.

Figure 3:
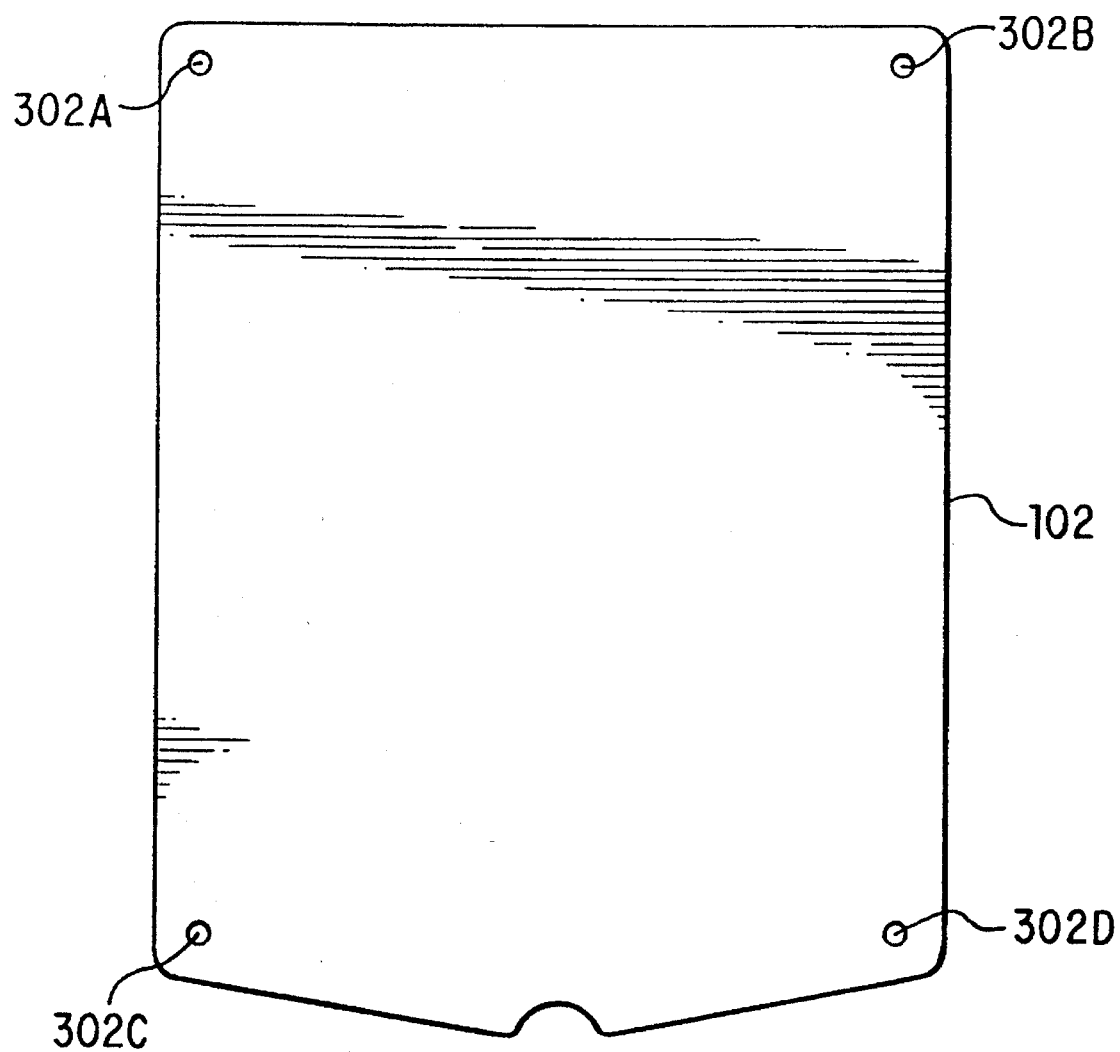
FIG. 3 is a plan view of a base plate of the autoradiography cassette.
Figure 4:
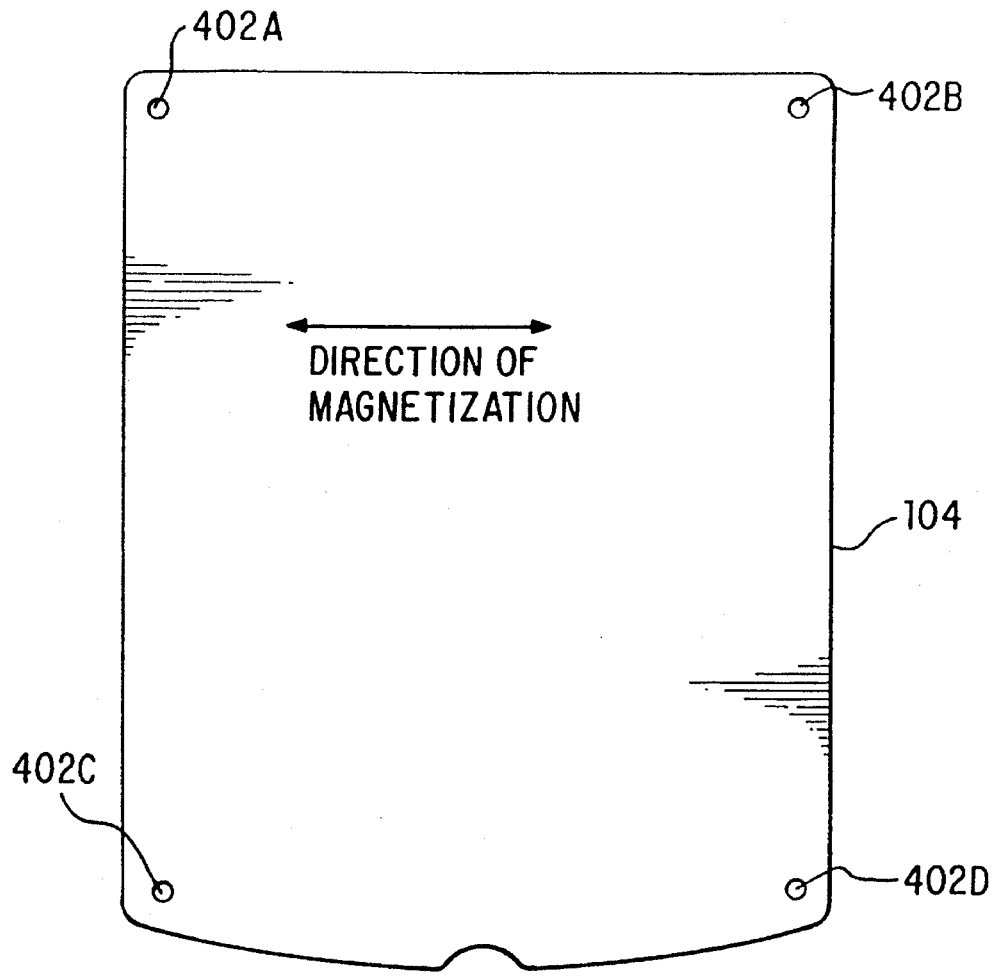
FIG. 4 is a plan view of a first flexible magnetic sheet of the autoradiography cassette.

As illustrated in FIG. 3, base plate 102 is substantially rectangular in shape with a through hole 302 positioned near each corner. Similarly, as illustrated in FIG. 4, first magnetic sheet 104 is substantially rectangular in shape with a through hole 402 positioned near each corner. Each hole 402 of first magnetic sheet 104 corresponds to a hole 302 of base plate 102. However, holes 402 are larger than holes 302. In the preferred embodiment, holes 302 are round with a diameter of 0.261 inches. Holes 402 are elongated with a minor diameter of 0.280 inches and a major diameter of 0.350 inches.

Figure 5:
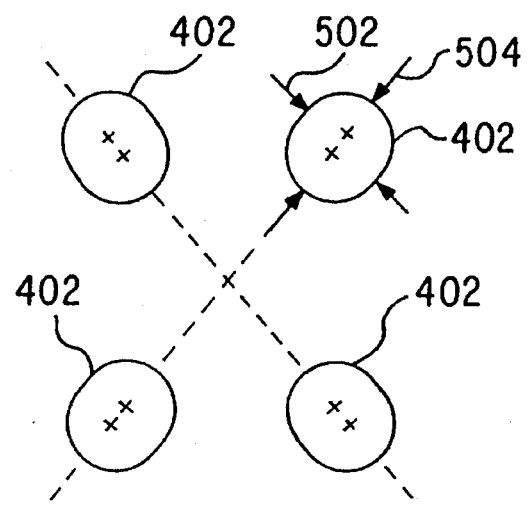
FIG. 5 is a diagram illustrating the relationship between the four attachment holes in the first flexible magnetic sheet of the autoradiography cassette.

Holes 402 are illustrated in FIG. 5. Note that a major diameter 504 of holes 402 are aligned diagonally across first magnetic sheet 104. A minor diameter of holes 402 is indicated at 502.

In the preferred embodiment, holes 402A and 402B of first magnetic sheet 104 are aligned with holes 302A and 302B of base plate 102. A first rivet 108A is passed through holes 402A and 302A to secure first magnetic sheet 104 to base plate 102. A second rivet 108B is passed through holes 402B and 302B. Similarly, holes 402C and 402D of first magnetic sheet 104 are aligned with holes 302C and 302D of base plate 102. A third rivet 108C is passed through holes 402C and 302C to secure first magnetic sheet 104 to base plate 102. A fourth rivet 108D is passed through holes 402D and 302D.

Figure 7:
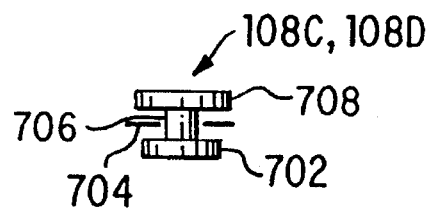
FIG. 7 is a diagram illustrating a second rubber rivet used to attach a first flexible magnetic sheet to a base plate of the autoradiography cassette.
Figure 6:
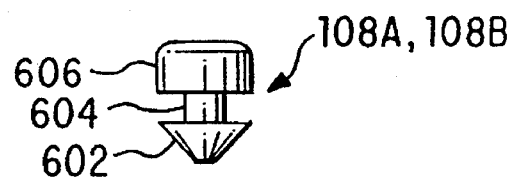
FIG. 6 is a diagram illustrating a first rubber rivet used to attach a first flexible magnetic sheet to a base plate of the autoradiography cassette.

In the preferred embodiment, first and second rivets 108A, 108B are rubber rivets as illustrated in FIG. 6. Rivets 108A,108B include a base portion 602, a stem portion 604 and an extended head portion 606. Third and fourth rivets 108C,108D are rubber rivets as illustrated in FIG. 7. Rivets 108C,108D include a base portion 702, a stem portion 706, a head portion 708 and a washer 706. Stem portions 604,706 have diameters configured to fit within holes 302 of base plate 102. However, stem portions 604,706 are smaller than holes 402 of first magnetic sheet 104 such that first magnetic sheet 104 is permitted to slide or move slightly with respect to base plate 102. This is further facilitated by the elongated shape of holes 402 as illustrated in FIG. 5. Holes 402 and rivets 108 compensate for the differing coefficients of thermal expansion between base plate 102 and first magnetic sheet 104.

Figure 8:
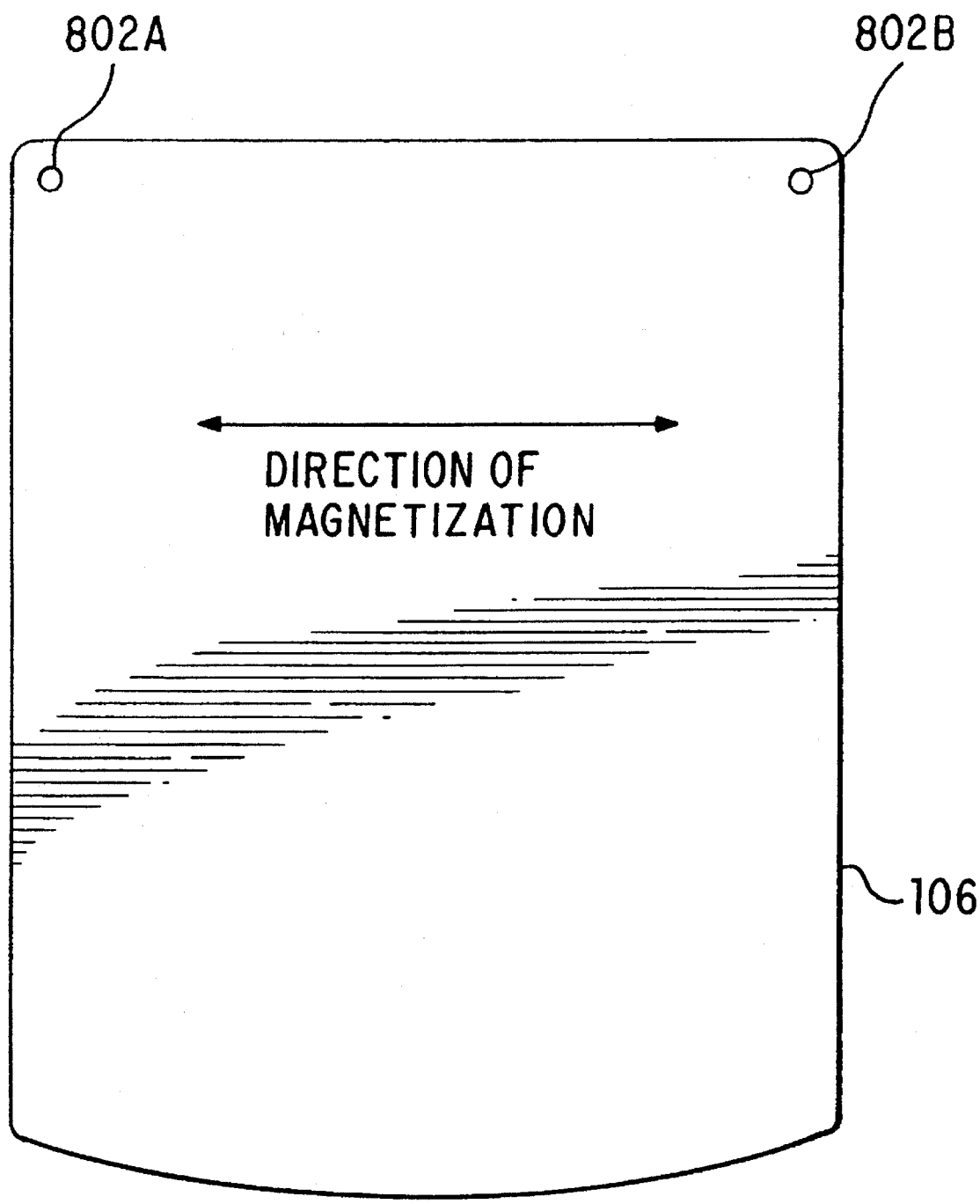
FIG. 8 is a plan view of a second flexible magnetic sheet of the autoradiography cassette.

The preferred embodiment of second magnetic sheet 106 is illustrated in FIG. 8. Second magnetic sheet 106 includes through holes 802A and 802B in its upper corners. Hole 802A is configured to correspond to rivet 108A and hole 802B is configured to correspond to rivet 108B when second magnetic sheet 106 is placed on top of first magnetic sheet 104. Holes 802 have a diameter greater than the diameter of head portion 606 of rivets 108A and 108B. In the preferred embodiment, holes 802 are round with a diameter of 0.562 inches. This allows rivets 108A,108B, which extend upward through first magnetic sheet 104, to act as alignment pins for the alignment of second magnetic sheet 106 with first magnetic sheet 104.

Because first and second magnetic sheets 104, 106 are formed from the same material, they will have the same coefficients of thermal expansion. Thus, changing temperatures will not cause warping, curling or buckling, and the sheets will hold a sample and film tightly together in a light-free environment.

Proper alignment of magnetic sheets 104, 106 is important. As discussed above, magnetic sheets 104,106 are magnetized in a horizontal direction (as indicated in FIGS. 5 and 8) with a pole spacing of 0.095 inches. The sheets are magnetized so that mechanical alignment via the alignment pins (rivets 108) will cause the magnetic poles of the two sheets to be parallel to one another. If the poles are perpendicular, the magnetic attraction between the sheets is substantially reduced. In addition, the sheets are preferably aligned so that North poles of one sheet are adjacent South poles of the other sheets this will promote optimal magnetic attraction. Furthermore, because the magnetic sheet stock used to create magnetic sheets 104,106 may not be perfectly magnetized, sheets 104,106 may have regions which do not attract well (even though the alignment discussed above is performed). To prevent this, magnetic sheets 104, 106 are joined together and tested for good magnetic coupling. If the sheets do not couple well, they are not used together. Once a good mating pair is found, they are used as a matched pair. In the preferred embodiment of the invention, these two sheets are given similar serial numbers to indicate their pairing. This will prevent sheets from other cassettes from being substituted for a matching sheet.

Generally, an autoradiography film is approximately 0.007 inches thick and a gel on a sample paper is approximately 0.018 inches thick. Together they are approximately 0.025 inches thick. Intensifying screens are approximately 0.027 inches thick. If two intensifying screens are used with the sample and film, then the total package to be placed in cassette 100 will have a thickness of approximately 0.079 inches. The cassette of the invention will firmly hold such a package together and shield it from ambient light.

Figure 9:
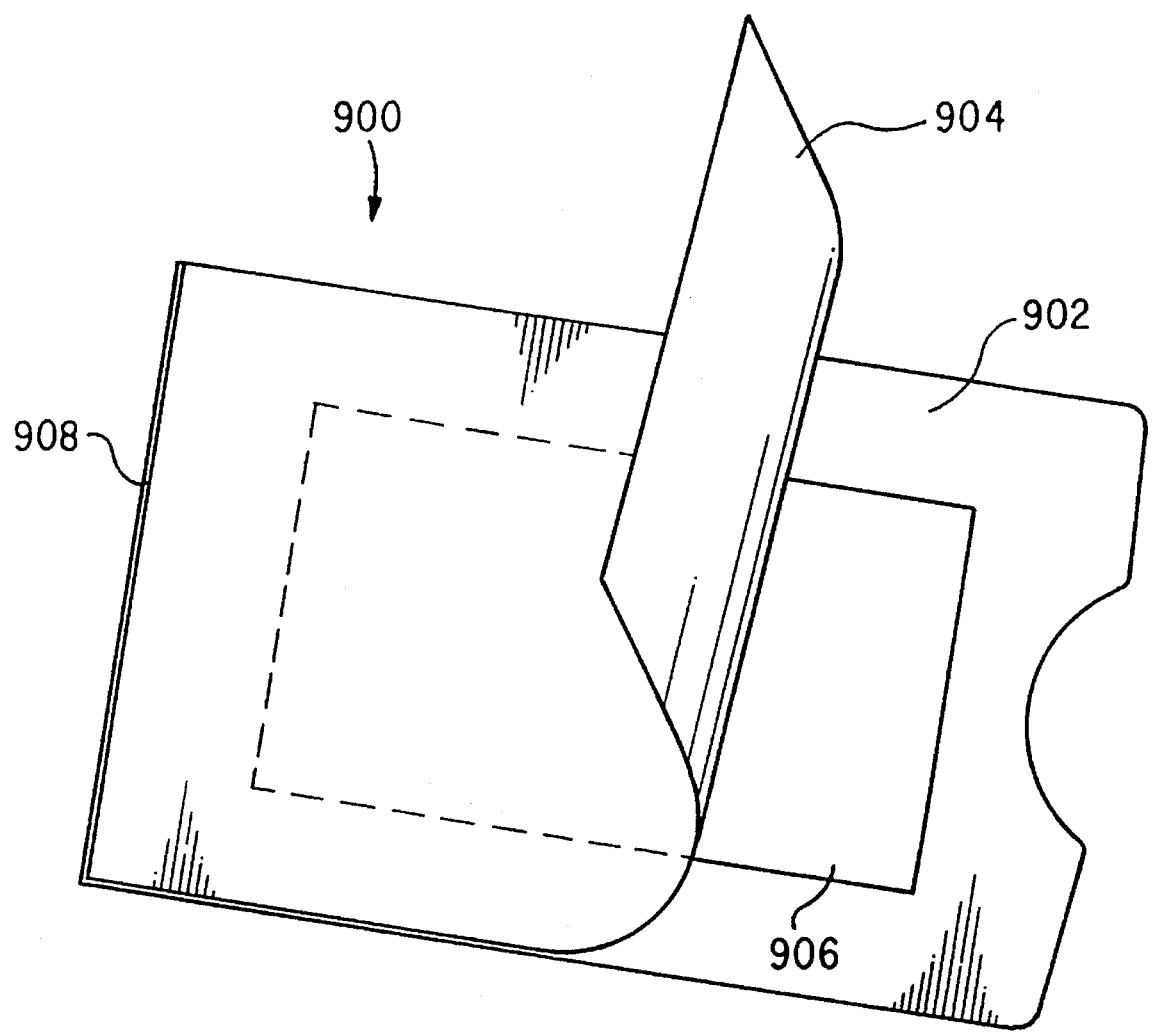
FIG. 9 is an illustration of a film cassette for use in chemiluminescence.

An alternate embodiment of the invention is shown in FIG. 9. FIG. 9 shows a cassette 900 having a base plate 902 and a flexible magnetic sheet 904. Magnetic sheet 904 is constructed from the same material as first and second magnetic sheets 104,106 discussed above. Base plate 902 is made from steel.

Magnetic sheet 904 is attached to base plate 902 near edge 908 to maintain alignment when lifting magnetic sheet 904. Attachment is achieved using a two sided adhesive tape such as 3M VHB (Very High Bond) tape produced by 3M Corporation, St. Paul, Minn. This tape has a thickness of approximately 0.005 inches. Other means (such as alignment pins or hinges) may also be used to attach magnetic sheet 904 to base plate 902.

This alternate embodiment of the invention is configured for use in chemiluminescence. Chemiluminescence does not require ultra-cold temperatures such as those used in autoradiography. Accordingly, the differing coefficients of thermal expansion of base plate 902 and magnetic sheet 904 do not pose a problem for cassette 900.

In addition, chemiluninescence does not use the relatively thick intensifier sheets used in radiograpy. Thus, it is not necessary that two magnetic sheets be used to secure the sample and film. A single magnetic sheet and a base plate made from a ferromagnetic material can be used. The single magnetic sheet can produce a sufficient magnetic field to attract the base plate through the sample and film (e.g., having a nominal combined thickness of 0.025 inches).

As with cassette 100, cassette 900 is configured to accept a film and a sample between magnetic sheet 904 and base plate 902. To enhance the chemiluminescence exposure, a mirrored sheet 906 is attached to base plate 902. Mirrored sheet 906 may be made from any light reflecting material. In the illustrated embodiment, mirrored sheet 906 is mirrored Mylar. Mylar is a trade name for a polyester material available from E. I. Du Pont de Nemours & Co. (Inc.), Wilmington, Del. If further enhancement of the chemiluminescent exposure is desired, a second mirrored sheet may be attached to the underside (i.e., the side facing base plate 902) of magnetic sheet 904.

While the invention has been particularly shown and described with reference to a preferred embodiment thereof, it will be understood by those skilled in the art that various change in form and details may be made therein without departing from the spirit and scope of the invention.

What is claimed is:

1. An autoradiography cassette comprising:

a substantially flat base plate defining a first plane;

a first flexible magnetic sheet;

means for attaching said fast magnetic sheet to said base plate such that said first magnetic sheet is permitted to move relative to said base plate in said first plane, wherein said means for attaching includes a plurality of rivets, a plurality of first holes in said base plate and a plurality of second holes in said first magnetic sheet, each rivet extending through a corresponding first hole and a corresponding second hole to secure said first magnetic sheet to said base plate, and wherein a medial portion of said rivets have a diameter substantially smaller than said second holes such that said first magnetic sheet is permitted to move relative to said base plate in said first plane; and a second flexible magnetic sheet positioned above said first magnetic sheet to magnetically couple with said first magnetic sheet.

2. The autoradiography cassette of claim 1, wherein each of at least two of said rivets further comprises a head portion extending outward through said corresponding second hole to form an alignment pin, and wherein said second magnetic sheet comprises at least two corresponding third holes having diameters greater than said head portions of said rivets, wherein said alignment pins cause said second magnetic sheet to align with said first magnetic sheet when said alignment pins are mated with said corresponding third holes.

3. The autoradiography cassette of claim 2, wherein said rivets are rubber rivets.

4. The autoradiography cassette of claim 3, wherein said base plate is formed from a plastic material.

* * * * *

UNITED STATES PATENT AND TRADEMARK OFFICE
CERTIFICATE OF CORRECTION

PATENT NO. : 5,483,076

DATED : January 9, 1996

INVENTOR(S) : FLESHER et al.

It is certified that error appears in the above-indentified patent and that said Letters Patent is hereby corrected as shown below:

Column 6, line 49, replace "fast" with --first--.

Signed and Sealed this

Thirtieth Day of April, 1996

Attest:

BRUCE LEHMAN

*Attesting Officer*    *Commissioner of Patents and Trademarks*